United States Patent [19]
Derosier

[11] Patent Number: 5,551,248
[45] Date of Patent: Sep. 3, 1996

[54] CONTROL APPARATUS FOR SPACE COOLING SYSTEM

[75] Inventor: Gregory S. Derosier, Conyers, Ga.

[73] Assignee: Heatcraft Inc., Grenada, Miss.

[21] Appl. No.: 383,250

[22] Filed: Feb. 3, 1995

[51] Int. Cl.$^6$ .................................................. F25B 41/04
[52] U.S. Cl. ................................ 62/155; 62/175; 62/181; 62/184; 62/225; 62/DIG. 17
[58] Field of Search .......................... 62/151, 152, 156, 62/175, 181, 183, 184, 203, 204, 208, 209, 210, 211, 212, 222, 223, 224, 225, 229, 155, 234, DIG. 17; 165/22

[56] References Cited

U.S. PATENT DOCUMENTS

| | | | |
|---|---|---|---|
| 4,067,203 | 1/1978 | Behr | 62/208 |
| 4,523,435 | 6/1985 | Lord | 62/212 |
| 4,617,804 | 10/1986 | Fukushima et al. | 62/212 |
| 4,620,424 | 11/1986 | Tanaka et al. | 62/222 |
| 4,674,292 | 6/1987 | Ohya et al. | 62/223 |
| 4,698,981 | 10/1987 | Kaneko et al. | 62/225 X |
| 4,768,348 | 9/1988 | Noguchi | 62/211 X |
| 4,787,213 | 11/1988 | Gras et al. | 62/212 |
| 5,035,119 | 7/1991 | Alsenz | 62/175 X |
| 5,131,237 | 7/1992 | Valbjorn | 62/204 X |
| 5,142,877 | 9/1992 | Shimizu | 165/22 X |
| 5,222,371 | 6/1993 | Doyama et al. | 62/229 X |
| 5,255,529 | 10/1993 | Powell et al. | 62/184 X |
| 5,289,692 | 3/1994 | Campbell et al. | 62/DIG. 17 |
| 5,477,701 | 12/1995 | Kenyon et al. | 62/225 |

*Primary Examiner*—Harry B. Tanner
*Attorney, Agent, or Firm*—W. Kirk McCord

[57] ABSTRACT

Apparatus for providing integrated control of a space cooling system is disclosed. The apparatus receives inputs from a plurality of temperature sensors, including a temperature sensor for measuring evaporator superheat, space temperature and compressor discharge temperature. The control apparatus incrementally adjusts the position of the cooling system expansion valve to regulate evaporator superheat and compressor discharge temperature and cycles the outdoor condenser fan on and off to raise condenser pressure in response to a low condenser pressure condition. In one embodiment, the cooling system includes a plurality of evaporators and a corresponding plurality of controllers electrically interconnected in a series loop for controlling the expansion valves and defrost heaters associated with the respective evaporators. One of the controllers functions as a master controller and receives inputs from the space temperature sensor and the compressor discharge temperature sensor as well as from the temperature sensors associated with the corresponding evaporator. The master controller activates and deactivates the cooling cycles in response to the inputs from the space temperature sensor. Both the master controller and each slave controller separately control the corresponding expansion valve and defroster. The master controller also initiates the system defrost cycle. However, once the defrost cycle is initiated, each slave controller controls the defrost cycle for its corresponding evaporator.

20 Claims, 8 Drawing Sheets

CONTROL APPARATUS FOR SPACE COOLING SYSTEM

FIELD OF THE INVENTION

This invention relates generally to space cooling systems and in particular to apparatus for controlling a space cooling system.

BACKGROUND ART

Space cooling systems, including both refrigeration and comfort cooling systems, typically include one or more evaporators in heat exchange relationship with the space to be cooled, a condenser external to the space, a compressor for circulating a heat transfer medium, such as a vapor compression refrigerant, between the evaporator and the condenser, and an expansion valve located between the condenser outlet and the inlet to each evaporator. The expansion valve may be positionable at various intermediate positions between a fully open position and a fully closed position to regulate the flow rate of the heat transfer medium through the evaporator. An indoor fan is typically included to provide an airflow across the evaporator and an outdoor fan is provided for cooling the condenser. Conventional space cooling systems also typically include a defrost heater associated with each evaporator, an electro-mechanical defrost timer for selectively activating and deactivating the defrost heater(s), an electrically operable solenoid valve upstream of the expansion valve, and various temperature and pressure sensors for measuring selected temperature and pressure parameters.

Modern-day space cooling systems may also include a microcomputer programmed to control operation of the system based on inputs from various temperature and pressure sensors. Each expansion valve may be controlled in response to the measured temperature differential across the corresponding evaporator. This temperature differential is commonly referred to as the evaporator superheat. Various techniques for controlling the expansion valve in response to evaporator superheat are set forth in U.S. Pat. Nos. 4,067,203; 4,523,435; 4,617,804; 4,620,424; 4,674,292; and 4,787,213.

If one or more evaporators are added or removed from the system, the controller must be re-programmed to control the expansion valves associated with the respective evaporators. Alternatively, a separate controller may be provided for each expansion valve such that each controller is operated separately from the other controllers. In that case, each controller must be configured to receive inputs from all of the system's temperature and pressure sensors.

There is therefore a need for integrated control of a space cooling system and in particular a space cooling system having plural evaporators and expansion valves.

DISCLOSURE OF INVENTION

In accordance with the present invention, control apparatus is provided for a space cooling system (e.g., refrigeration system) of the type having an evaporator in heat exchange relationship with the space to be cooled; a condenser external to the space; condenser cooling means (e.g., a fan) for supplying cooling medium (e.g., air) to the condenser; a compressor for circulating heat transfer fluid (e.g., a vapor compression refrigerant) between the evaporator and condenser; and an expansion valve between the outlet side of the condenser and the inlet side of the evaporator. The expansion valve is positionable in at least a fully open position to allow the heat transfer fluid to enter the evaporator and a fully closed position to substantially inhibit the heat transfer fluid from entering the evaporator. The control apparatus includes a first temperature sensor for sensing a difference in temperature between the heat transfer fluid at the evaporator inlet and the heat transfer fluid at the evaporator outlet and for generating a first electrical signal indicative thereof, which corresponds to a level of superheat across the evaporator. The control apparatus further includes a second temperature sensor for sensing temperature of the heat transfer fluid on a discharge side of the compressor and for generating a second electrical indicative thereof.

In accordance with one aspect of the invention, the control apparatus includes means for increasing condenser pressure in response to the level of superheat indicated by the first electrical signal being greater than a predetermined level when the expansion valve is in the fully open position and the compressor is operative. In accordance with one embodiment of the invention, operation of the condenser cooling means is interrupted periodically to reduce flow rate of the cooling medium across the condenser and increase pressure of the heat transfer fluid in the condenser. The control apparatus is further operable to enable uninterrupted operation of the condenser cooling means when the compressor is operative in response to the temperature of the heat transfer fluid on the discharge side of the compressor indicated by the second electrical signal being greater than a selected temperature when the compressor is not operative.

In accordance with another aspect of the invention, the control apparatus is operable to control an expansion valve which is positionable at a plurality of intermediate positions between the fully open position and the fully closed position to regulate the level of superheat by periodically sampling the first electrical signal and iteratively adjusting the position of the expansion valve in selected increments in response to successive samplings of the first electrical signal until the level of superheat meets a desired superheat condition.

In accordance with yet another aspect of the invention, the control apparatus is further operable to adjust the position of the expansion valve to a more open position in response to the temperature of the heat transfer fluid on the discharge side of the compressor indicated by the second electrical signal, being greater than a predetermined limit when the compressor is operative. This control function is accomplished by periodically sampling the second electrical signal and progressively opening the expansion valve in selected increments in response to successive samplings of the second electrical signal until the temperature of the heat transfer fluid on the discharge side of the compressor is within the prescribed limit when the compressor is operative.

In accordance with still another aspect of the invention, the control apparatus is adapted to control operation of a space cooling system of the type having plural evaporators in heat exchange relationship with a space to be cooled and plural expansion valves, each of which is operatively associated with a corresponding one of the evaporators. The control apparatus includes plural first temperature sensors, each of which is adapted to sense a difference in temperature between the heat transfer fluid at an inlet to the corresponding evaporator and the heat transfer fluid at an outlet from the corresponding evaporator and for generating a corresponding first electrical signal indicative thereof, which corresponds to a level of superheat across the corresponding evaporator.

To control a space cooling system with plural evaporators, the control apparatus includes plural controllers, each of which is operatively associated with a corresponding one of the evaporators and a corresponding one of the expansion valves. One of the controllers functions as a master controller and is operable to activate the compressor to initiate a cooling cycle and to transmit a cooling on signal in response to a demand for space cooling as indicated by a space temperature sensor. The other one or more of the controllers function as slave controllers. Each of the controllers is operable to control the corresponding expansion valve in response to the corresponding first electrical signal when the cooling on signal is being transmitted by the master controller. The master controller is adapted to deactivate the compressor to terminate the cooling cycle and to transmit a cooling off signal in response to the absence of a demand for space cooling.

In accordance with a further aspect of the invention, the controllers are electrically connected in a series loop. A slave controller is adapted to relay a cooling on signal and a cooling off signal received from an adjacent controller upstream to an adjacent controller downstream, whereby a cooling on signal or a cooling off signal, as the case may be, is transmitted from the master controller to the slave controllers.

In accordance with still a further aspect of the invention, the space cooling system includes defrost means operatively associated with each of the evaporators and each of the controllers. The master controller transmits a defrost on signal to initiate a system defrost cycle in response to a condition indicating a need for system defrost. Each of the controllers (including both the master and the slave controllers) activates the corresponding defrost means to initiate a defrost cycle for the corresponding evaporator in response to the defrost on signal. Each of the slave controllers relays a defrost on signal to an adjacent controller downstream in response to either receipt of the defrost on signal from an adjacent controller upstream or a condition indicating that the defrost cycle for the corresponding evaporator has not been completed. The master controller transmits a defrost off signal in response to completion of the defrost cycle for the evaporator operatively associated with the master controller. Each of the slave controllers relays a defrost off signal to the adjacent controller downstream in response to both the receipt of the defrost off signal from the adjacent controller upstream and completion of the defrost cycle for the corresponding evaporator. The master controller terminates the system defrost cycle when the defrost off signal is returned to the master controller, indicating that the defrost cycle for each evaporator has been completed, or upon expiration of a predetermined defrost time, whichever occurs first.

BEST MODE FOR CARRYING OUT THE INVENTION

In the description which follows, like parts are marked throughout the specification and drawings with the same respective reference numbers. The drawings are not necessarily to scale and in some instances proportions may have been exaggerated in order to more clearly depict certain features of the invention.

Figure 1:
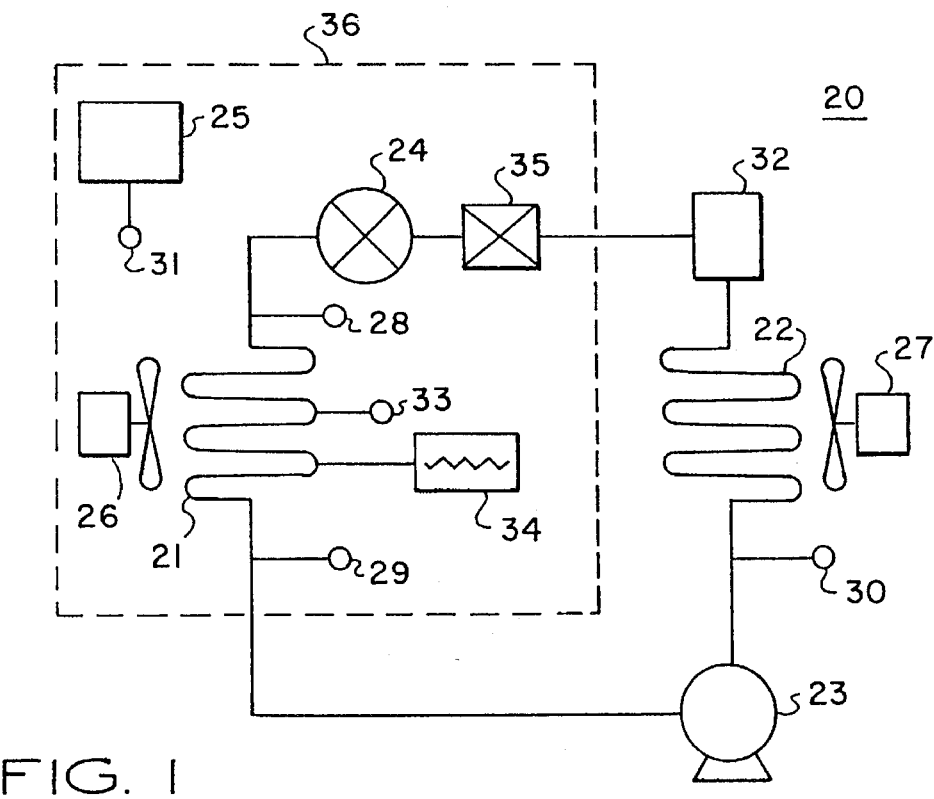
FIG. 1 is a schematic of a space cooling system having one indoor unit and one outdoor unit, the indoor unit including control apparatus according to the present invention.

Referring to FIG. 1, a space cooling system 20 is depicted. System 20 includes an evaporator 21 in heat exchange relationship with an indoor space to be cooled (e.g., refrigerated compartment), a condenser 22 external to the space, a compressor 23 for circulating heat transfer fluid (e.g., a vapor compression refrigerant) between evaporator 21 and condenser 22 and an expansion valve 24 located between an outlet side of condenser 22 and an inlet side of evaporator 21. A microcomputer-based controller 25 is provided to control operation of system 20. An indoor fan 26 is provided for directing ambient air in the space to be cooled across evaporator 21. An outdoor fan 27 is provided for directing outdoor air, which acts as a cooling medium, across condenser 22. Evaporator 21 and condenser 22 are both heat transfer coils, preferably with multiple passes, as illustrated in FIG. 1.

Expansion valve 24 is positionable in a fully open position to allow refrigerant to enter evaporator 21 unimpeded, in a fully closed position to substantially inhibit refrigerant from entering evaporator 21, and in a plurality of intermediate positions between the fully open position and the fully closed position to regulate the flow rate of refrigerant through evaporator 21, as will be described in greater detail hereinafter. Expansion valve 24 may be of the type operated by an electrically operable solenoid or an electrically operable step motor. In either case, expansion valve 24 is adjustable in selected increments to regulate the flow rate of refrigerant through evaporator 21.

First and second temperature sensors 28 and 29 are respectively positioned on inlet and outlet sides of evaporator 21 for measuring evaporator inlet temperature and evaporator outlet temperature, respectively. The temperature difference across evaporator 21 corresponds to a level of superheat across evaporator 21. A third temperature sensor 30 is located on a discharge side of compressor 23 for measuring compressor discharge temperature and a fourth temperature sensor 31 measures the ambient temperature of the space to be cooled. Temperature sensors 28, 29, 30 and 31 are preferably thermistors. A receiver 32 is provided for receiving excess liquid refrigerant. A defrost temperature sensor 33 is provided for sensing temperature of the refrigerant in evaporator 21 and an electrically resistive defrost heater 34 is provided for heating evaporator 21 during defrost operation. Alternatively, space cooling system 20 may include hot gas defrost capability for introducing hot gas into evaporator 21 during defrost operation. A solenoid-operated valve 35 is located between expansion valve 24 and condenser 22. Valve 35 is positionable in a fully open position and a fully closed position. Depending on the configuration of system 20, receiver 32, defrost temperature sensor 33, defrost heater 34 and/or valve 35 are optional.

Evaporator 21, expansion valve 24, controller 25, indoor fan 26, temperature sensors 28, 29, 31 and 33, defrost heater 34 and valve 35 are typically housed in an indoor unit 36, which is defined by the dashed lines in FIG. 1. Condenser 22, compressor 23, outdoor fan 27, temperature sensor 30 and receiver 32 are typically housed in an outdoor unit.

Figure 2:
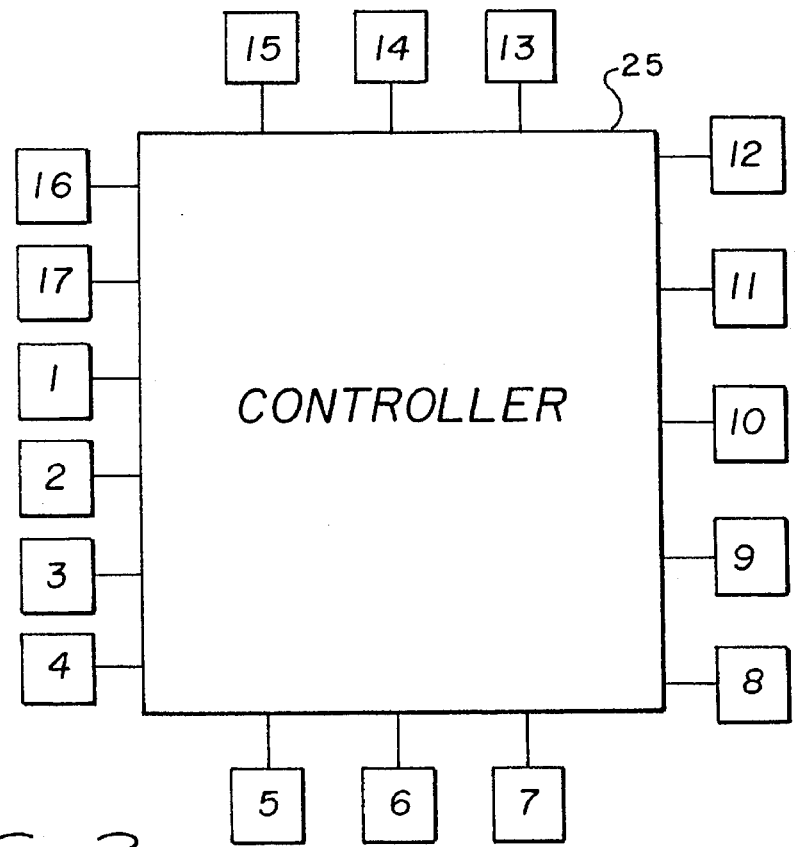
FIG. 2 is a block diagram of the control apparatus, showing inputs to and outputs from the control apparatus.

Referring also to FIG. 2, controller 25 preferably includes a microcomputer of the ST62T25 type, manufactured and sold by SGS-Thomson Microelectronics, of Phoenix, Ariz., and a control board having a plurality of input and output connections. The input connections are indicated by reference numbers 1–7 and the output connections are indicated by reference numbers 8–17. The respective input and output connections are identified in the following Table I.

TABLE I

| Ref. No. | Input/Output |
| --- | --- |
| 1 | Space temperature sensor 31 input |
| 2 | Evaporator inlet temperature sensor 28 input |
| 3 | Evaporator outlet temperature sensor 29 input |
| 4 | Defrost temperature sensor 33 input |
| 5 | Compressor discharge temperature sensor 30 input |
| 6 | Multi-unit input |
| 7 | Space temperature setpoint input |
| 8 | Multi-unit output |
| 9 | Outdoor fan 27 control output |
| 10 | Compressor 23 control output |
| 11 | Expansion valve 24 (step motor-operated) control output |
| 12 | Solenoid-operated valve 35 control output |
| 13 | System alarm control output |
| 14 | Defrost heater 34 control output |
| 15 | Indoor fan 26 control output |
| 16 | Expansion valve 24 (solenoid-operated) control output |
| 17 | Indicator light control output |

As will be described in greater detail hereinafter, controller 25 controls various functions and components of space cooling system 20, as indicated by outputs 8–17 in response to inputs 1–7. Further, controller 25 is programmable using configuration jumper connections (not shown). For example, the time between defrost cycles can be programmed based on elapsed time or compressor run time to control initiation of a defrost cycle; a defrost duration and a defrost end temperature may be programmed so that the defrost cycle is ended when the defrost end temperature is reached or when the defrost duration has expired, whichever occurs first; and a desired level of superheat may be programmed.

Figure 3:
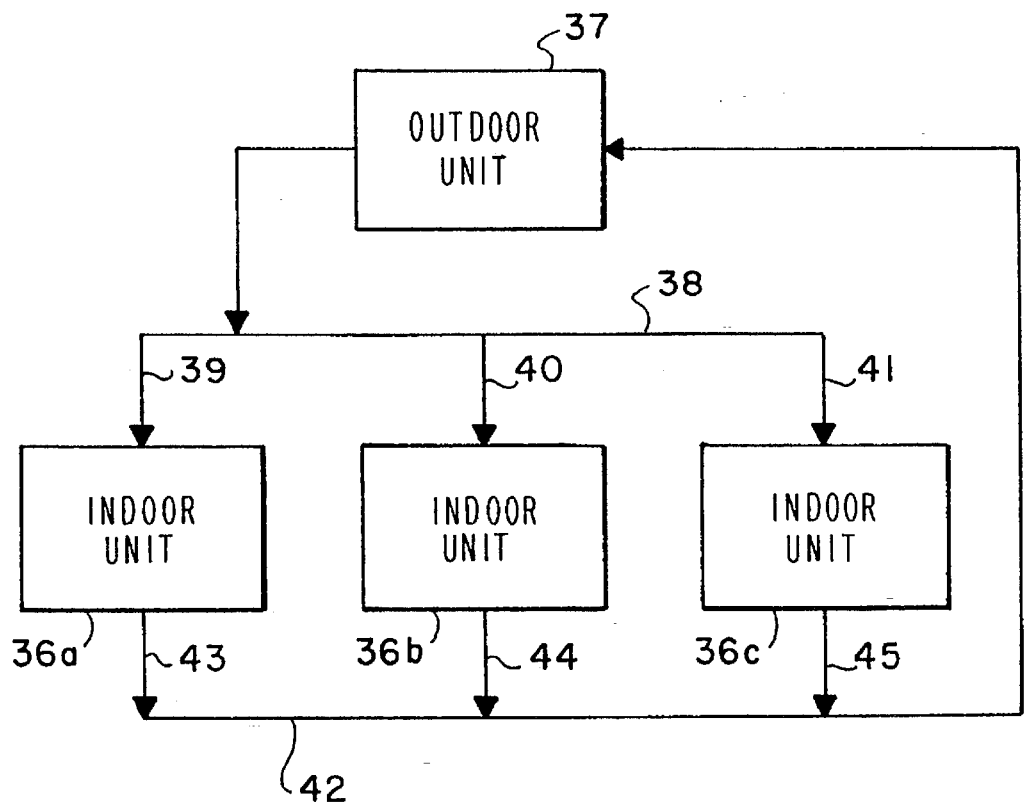
FIG. 3 is a block diagram of a space cooling system having plural indoor units.
Figure 4:
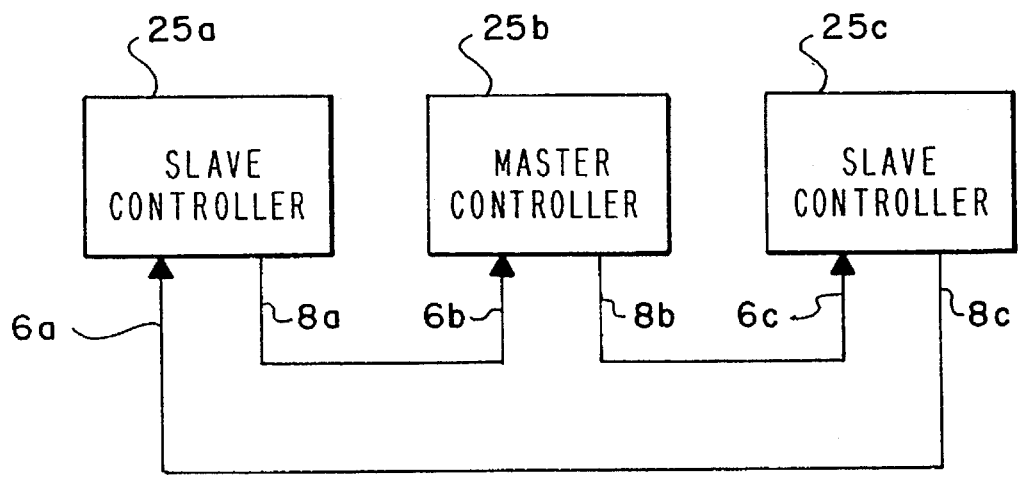
FIG. 4 is a block diagram of control apparatus for controlling the space cooling system of FIG. 3, according to the present invention.

Referring also to FIGS. 3 and 4, space cooling system 20 may be configured with plural indoor units 36a, 36b and 36c. Each indoor unit 36a, 36b, 36c includes selected ones of the indoor components shown in FIG. 1 (i.e., at least evaporator 21, expansion valve 24, controller 25 and temperature sensors 28, 29). Since the three indoor units 36a, 36b, 36c are located in the same space, only one space temperature sensor 31 is required. Indoor units 36a, 36b and 36c are operatively associated with one outdoor unit 37, which contains condenser 22, compressor 23, outdoor fan 27, compressor discharge temperature sensor 30 and receiver 32.

As shown in FIG. 3, liquid refrigerant leaving condenser 22 is directed to the corresponding evaporator 21 of each indoor unit 36a, 36b, 36c through the corresponding expansion valve 24, whereby indoor units 36a, 36b and 36c are operated in parallel. The system preferably includes a liquid refrigerant input header 38 with branches 39, 40 and 41 to the respective indoor units 36a, 36b and 36c. The system also includes a vapor refrigerant output header 42 for receiving refrigerant in a vapor state from the respective evaporator outlets 43, 44 and 45 of the three indoor units 36a, 36b and 36c. Outlet header 42 is in fluid communication with an inlet side of compressor 23 in outdoor unit 37. Although three indoor units 36a, 36b and 36c are illustrated, one skilled in the art will recognize that system 20 may include a greater or lesser number of indoor units 36. Further, system 20 may include plural outdoor units 37 or, alternatively, condenser 22 may be divided into discrete sections with an outdoor fan 27 operatively associated with each section, whereby each section of condenser 22 and the corresponding outdoor fan 27 is operatively associated with one of the indoor units 36a, 36b, 36c for parallel operation of outdoor unit 37.

Each indoor unit 36a, 36b, 36c has a dedicated controller 25 configured as shown in FIG. 2. One of the controllers 25 is typically designated as a master controller and the other two controllers 25 are designated as slave controllers. For example, in FIG. 4, the three controllers 25a, 25b and 25c are operatively associated with indoor units 36a, 36b and 36c, respectively. Controller 25b is designated as the master controller, while controllers 25a and 25c are slave controllers. Controllers 25a, 25b and 25c are electrically interconnected in a series loop, such that control signals transmitted by master controller 25b are relayed in series to slave controllers 25a and 25c. For example, a signal transmitted by master controller 25b via its multi-unit output 8b is received by slave controller 25c on its multi-unit input 6c. Slave controller 25c then relays the signal via its multi-unit output 8c to slave controller 25a, which receives the signal on its multi-unit input 6a and relays the signal via its multi-unit output 8a back to master controller 25b, which receives the signal on its multi-unit input 8a.

Each controller 25a, 25b, 25c receives inputs from the corresponding temperature sensors 28 and 29, and, if present, the corresponding temperature sensor 33 for controlling the corresponding expansion valve 24, solenoid-operated valve 35 (if present) and the corresponding defrost heater 34 (if present). However, typically, only master controller 25b receives inputs from compressor discharge temperature sensor 30 and space temperature sensor 31 for controlling compressor 23 and outdoor fan 27. Although each controller 25a, 25b, 25c has the same hardware configuration (as shown in and described with reference to FIG. 2), slave controllers 25a and 25c do not receive inputs from space temperature sensor 31 (input 1 in FIG. 2), space temperature setpoint (input 7 in FIG. 2), or compressor discharge temperature sensor 30 (input 5 in FIG. 2). Further, slave controllers 25a and 25c are not electrically connected to outdoor fan 27 or compressor 23 (output connections 9 and 10, respectively, in FIG. 2) became outdoor fan 27 and compressor 23 are controlled by master controller 25b. As previously mentioned, indoor fan 26, solenoid-operated valve 35, defrost temperature sensor 33 and defrost heater 34 are optional components, such that in the most basic configuration, each slave controller 25a, 25c receives inputs only from the corresponding temperature sensors 28 and 29 for determining evaporator superheat and controlling the corresponding expansion valve 24 accordingly. The operation of space cooling system 20 and in particular the control thereof will be described in greater detail hereinbelow with reference to FIGS. 5–8.

Figure 5:
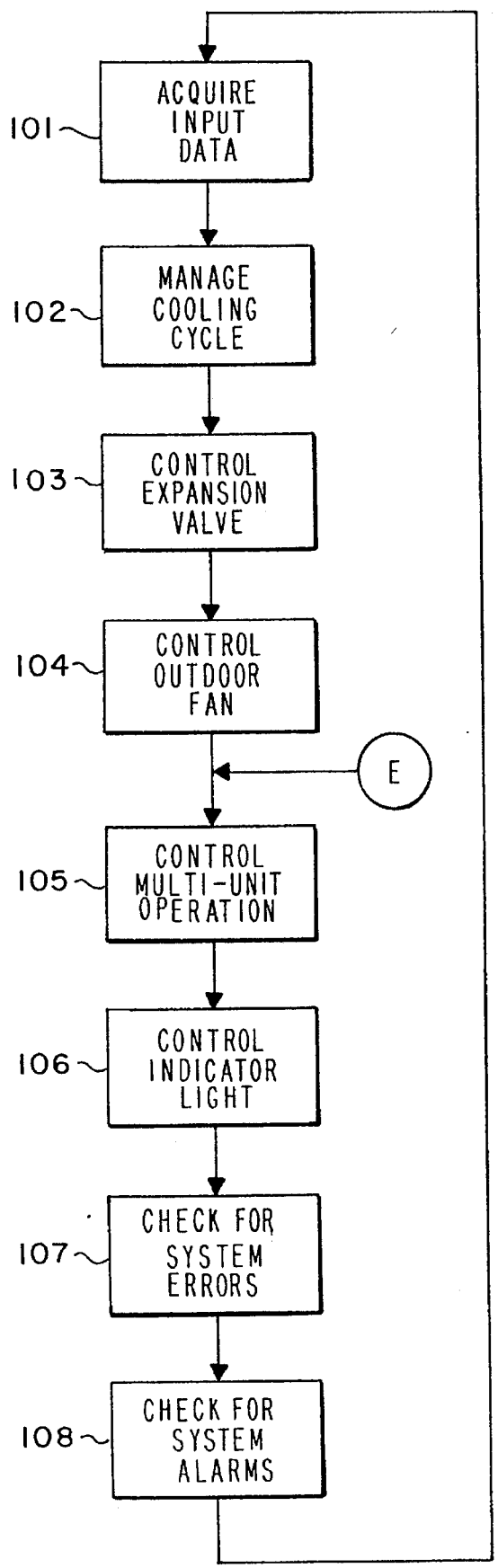
FIGS. 5–8 are respective flow charts depicting the sequence of operation of the control apparatus, according to the present invention.

Referring to FIG. 5, the control sequence is depicted. Pursuant to step 101, the control performs an Acquire Input Data routine to acquire relevant input data, including the various parameters programmed by means of the configuration jumpers described hereinabove (e.g., time between defrost cycles, defrost duration, defrost end temperature and desired superheat) and temperature data such as evaporator inlet and outlet temperatures, compressor discharge temperature and space temperature. Using this input data, the control updates the space temperature differential (i.e., the difference between the actual space temperature and the temperature setpoint), the compressor discharge temperature and the level of superheat. When the system includes plural controllers (e.g., controllers 25a, 25b, 25c in FIG. 4), each controller acquires relevant input data. For example, the slave controllers (e.g., controllers 25a and 25c in FIG. 4) will not receive input data from space temperature sensor 31 or from compressor discharge temperature sensor 30. Therefore, only the master controller (e.g., controller 25b in FIG. 4) will update the space temperature differential and compressor discharge temperature.

Figure 6A:
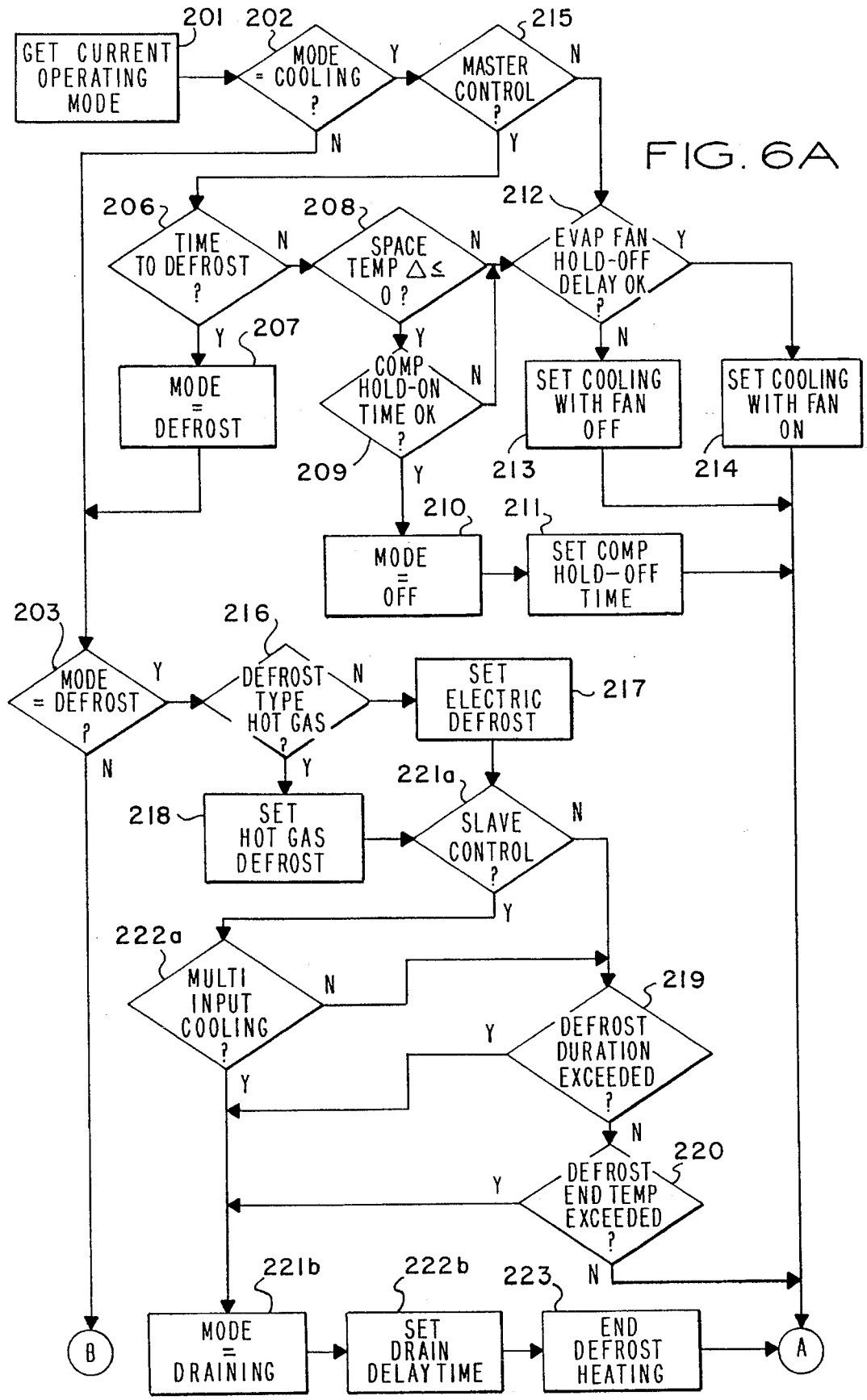
Figure 6B:
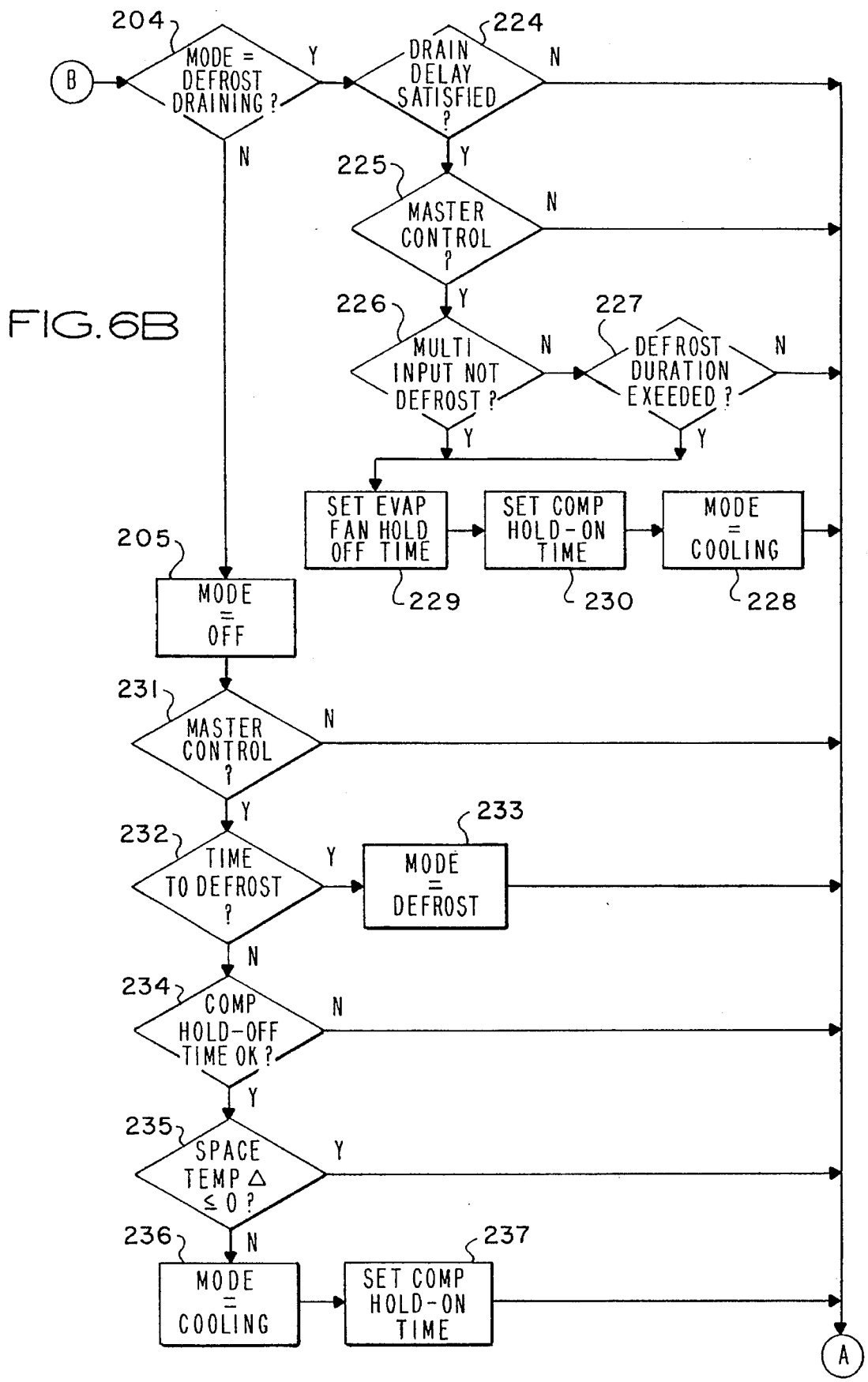
Figure 6C:
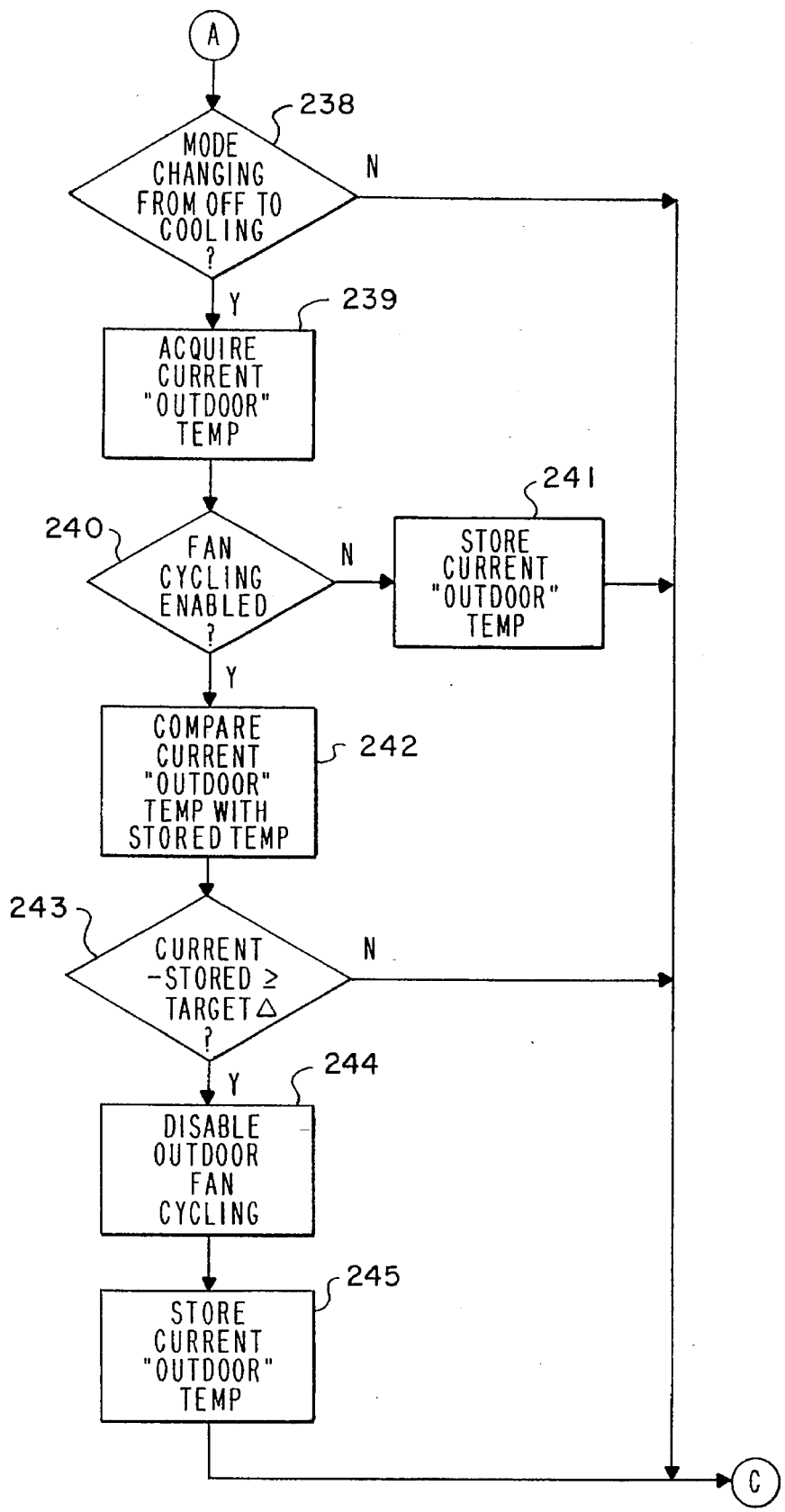

Pursuant to step 102 of FIG. 5, each controller performs a Manage Cooling Cycle routine, as shown in greater detail in FIGS. 6A–6C. Referring now to FIGS. 6A–6C, each controller determines the current operating mode of the system, pursuant to steps 201–205. If the system is in a Cooling mode, the master controller determines whether it is time to defrost (i.e., based on the programmed time between successive defrost cycles or based on compressor run time), pursuant to step 206. If it is time to defrost, the master controller initiates a Defrost mode, pursuant to step 207. If it is not time to defrost, the master controller determines whether the space temperature differential (Space Temperature Δ) is less than or equal to zero, pursuant to step 208. If the space temperature differential is less than or equal to zero, there is no call for cooling and if the hold-on time (e.g., 3 minutes) for the compressor (e.g., compressor 23 in FIG. 1) has been satisfied, pursuant to step 209, master controller 25b terminates the Cooling mode and initiates an Off mode, pursuant to step 210. The master controller sets the compressor hold-off time (e.g., 3 minutes), pursuant to step 211.

If the space temperature differential is not less than or equal to zero, there is a call for cooling. Each controller controls its own evaporator fan (e.g., indoor fan 26 in FIG. 1). In the corresponding evaporator fan hold-off time (e.g., 60 seconds) has been satisfied, pursuant to step 212, the Cooling mode is set with the evaporator fan on, pursuant to step 213. If the evaporator fan hold-off time has not been satisfied, the Cooling mode is set with the fan off, pursuant to step 214. Steps 212–214 are performed by each controller. If the controller is not the master controller (as determined according to step 215), it will not perform steps 206–211.

If the system is not in a Cooling mode, but is determined to be in a Defrost mode, pursuant to step 203, each controller determines whether hot gas or an electric defrost heater (e.g., defrost heater 34 in FIG. 1) is being used, pursuant to steps 216, 217 and 218. Although the Defrost mode is initiated only by the master controller based on a programmed time parameter (e.g., either a programmed time between successive defrost cycles or a programmed compressor run time), the defrost cycle is controlled for each evaporator by the corresponding controller. Each controller is programmed for a particular defrost duration (e.g., 30 minutes) and a particular defrost end temperature (e.g., 70° F.). Each controller ends its own defrost cycle in response to the programmed defrost duration having been exceeded or the defrost end temperature having been reached, whichever occurs first, pursuant to steps 219 and 220. If the controller is a slave controller (as determined according to step 221), it will cut short its defrost cycle in response to a Cooling signal received on its multi-unit input (e.g., inputs 6a and 6c in FIG. 4), pursuant to step 222. Upon termination of its defrost cycle, each controller enters a Drain mode for a predetermined drain delay time (e.g., 60 seconds) pursuant to steps 221, 222 and 223, to allow drainage of melted ice from the evaporator coil.

If a controller is not in the Defrost mode, but rather is in the Drain mode, as determined pursuant to step 204, the controller remains in the Drain mode for a preset drain delay time (e.g., 60 seconds), after which the Drain mode is terminated, pursuant to step 224. If the controller is the master controller, as determined according to step 225, it will initiate the Cooling mode if it does not receive a Defrost signal on its multi-unit input (e.g., input 6b in FIG. 4), pursuant to step 226, or if the defrost duration programmed into the master controller has been exceeded, pursuant to step 227. The defrost duration programmed into the master controller may be longer than the defrost duration programmed for the slave controllers.

Concurrently with initiating the Cooling mode, pursuant to step 228, the master controller sets the evaporator fan hold off time (e.g., 60 seconds), pursuant to step 229, and the compressor hold on time (e.g., 3 minutes), pursuant to step 230. During the evaporator fan hold off period, residual water and vapor on the outside of the evaporator coil are frozen before the evaporator fan is re-activated so that residual water is not discharged into the space by the evaporator fan. The system compressor is on during "refreezing". Upon expiration of evaporator fan hold off time, the evaporator fan is re-activated.

If it is determined that the current operating mode is the Off mode, pursuant to step 205, the master controller determines whether it is time to initiate a defrost cycle, pursuant to steps 231 and 232. If so, the Defrost mode is initiated, pursuant to step 233. If not, the system remains in the Off mode unless both the compressor hold off time (e.g., 3 minutes) has been satisfied, pursuant to step 234, and the space temperature differential is positive, pursuant to step 235. If both of these conditions occur, the master controller initiates the Cooling mode, pursuant to step 236, and sets the compressor hold on time, pursuant to step 237.

The On/Off state of the various system components (identified with reference FIG. 1) in each operating mode is set forth in the following Table II.

TABLE II

| Mode | Compressor 23 | Fan 27 | Fan 26 | Output to Defrost Htr. 34 | Exp. Valve 24 | Valve 35 |
| --- | --- | --- | --- | --- | --- | --- |
| Cooling | On | On or cycling | On | Off | Partly open | Open |
| Off | Delay then off | Off | On | Off | Near closed | Closed |
| Electric Defrost | Off | Off | Off | On | Closed | Closed |
| Drain | Off then on | Off then on or cycling | Off then on | Off | Closed then partly open | Closed then open |

In Cooling mode operation, compressor 23 and fan 26 are on; fan 27 is either continuously on or cycling (as will be described in greater detail hereinafter); defrost heater 34 is off; expansion valve 24 is open and is adjusted to control evaporator superheat (as will be described in greater detail hereinafter); and solenoid-operated valve 35 is open. At the end of a cooling cycle, expansion valve 24 is closed or near closed and valve 35 is closed. Compressor 23 remains on for a predetermined delay period (e.g., 12 seconds) to pump down refrigerant from evaporator 21 (FIG. 1) to condenser 22 (FIG. 1); outdoor fan 27 is turned off; indoor fan 26 remains on; and defrost heater 34 remains off. During Defrost mode operation with an electric defrost heater, compressor 23, outdoor fan 27 and indoor fan 26 are off; defrost heater 34 is on; expansion valve 24 is closed; and valve 35 is closed. If hot gas defrost is used in lieu of electric defrost, compressor 23 and outdoor fan 27 are on; evaporator fan 26 is off; expansion valve 24 is fully open; and valve 35 is open. A valve (not shown) is connected to a source of hot gas. When this valve is opened, hot gas is introduced into the evaporator(s) to defrost the evaporator(s). In the Drain mode, compressor 23 is off during the drain delay time (e.g., 60 seconds) and is then turned on to refreeze residual water on the evaporator coil; outdoor fan 27 is off during the drain delay time and is then turned on continuously or cycled (as will be described in greater detail hereinafter); indoor fan 26 is off during the drain delay time and is then turned on; defrost heater 34 is off; expansion valve 24 is closed during the drain delay time and is then partially opened; and valve 35 is closed during the drain delay time and then opened.

As part of the Mange Cooling Cycle routine depicted in FIGS. 6A–6C, the master controller determines whether the operating mode is changing from the Off mode to the Cooling mode, pursuant to step 238, just before compressor 23 is turned on to initiate the Cooling mode. If the mode is changing from Off to Cooling, the master controller acquires current "outdoor" temperature, pursuant to step 239 from the compressor discharge temperature sensor (sensor 30 in FIG. 1). The "outdoor" temperature corresponds to the temperature of the refrigerant on the discharge side of the compressor, as measured by the compressor discharge temperature sensor just before the compressor is turned on at the beginning of a cooling cycle. This "outdoor" temperature is used to control cycling of the outdoor fan (e.g., fan 27 in FIG. 1), as will be described in greater detail hereinafter.

If it is determined, pursuant to step 240, that the outdoor fan is not being cycled, the current "outdoor" temperature is stored, pursuant to step 241, to be used the next time that the outdoor fan is cycled. If the outdoor fan is being cycled, the master controller compares the current "outdoor" temperature with the previously stored "outdoor" temperature, pursuant to step 242. If the difference between the current "outdoor" temperature and the previously stored "outdoor" temperature is greater than or equal to a target differential (Target $\Delta$, e.g., 10° F.), pursuant to step 243, outdoor fan cycling is disabled, pursuant to step 244 and the current "outdoor" temperature is stored, pursuant to step 245.

Figure 7:
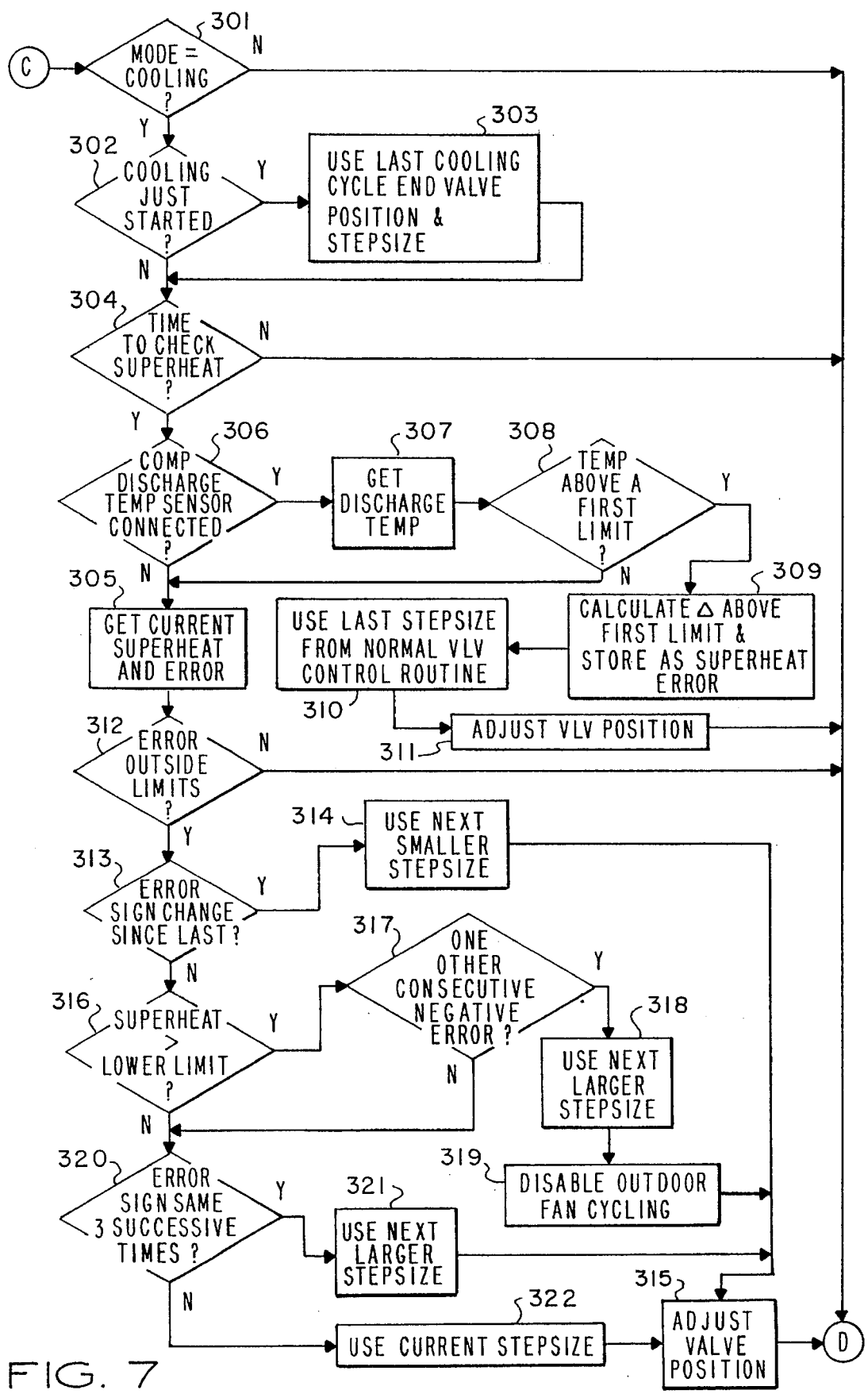

Upon completion of the Manage Cooling Cycle routine, the Control Expansion Valve routine is run, pursuant to step 103 of FIG. 5. FIG. 7 depicts the Control Expansion Valve routine in greater detail, whereby each controller (e.g., controller 25a, 25b, 25c in FIG. 4) controls its corresponding expansion valve (e.g., expansion valve 24 in FIG. 1).

Each controller controls its own expansion valve 24 by periodically (e.g., every 2 minutes) sampling the electric signals generated by the corresponding evaporator inlet and outlet temperature sensors (e.g., sensors 28 and 29 in FIG. 1) to determine superheat across the corresponding evaporator. Each controller adjusts the position of the corresponding expansion valve in response to the level of superheat and the superheat error (i.e., the difference between the actual level of superheat and the desired level of superheat programmed into the corresponding controller) to maintain the actual level of superheat within an acceptable limit (e.g., plus or minus 1° F.).

Referring to FIG. 7, if it is determined that the system is in the Cooling mode, pursuant to step 301, and the Cooling mode has just started, pursuant to step 302, the position of the corresponding expansion valve during the last cooling cycle and the last adjustment step size are used initially, pursuant to step 303. The position of the corresponding expansion valve is adjusted incrementally in selected steps, the size of the steps being variable. Step sizes are preset and arranged in binary order from full steps to fractional steps (i.e., 32, 16, 8, 4, 2, 1, ½, ¼, ⅛, 1/16). Fractional steps are accomplished by time-based duty cycling between two valve positions. If the last step size used during the immediately preceding cooling cycle was a fractional step, then the step size is reset to "1" at the beginning of the next cooling cycle to improve expansion valve response. The relatively large range in step sizes allows for matching of even oversized capacity expansion valves to a particular space cooling system.

Pursuant to steps 304 and 305, each controller periodically (e.g., every 2 minutes) samples the respective signals from the corresponding evaporator inlet and outlet temperature sensors and determines the current level of superheat and the superheat error. If the controller is connected to the compressor discharge temperature sensor (i.e., the master controller), the controller periodically (e.g., every two minutes) samples the signal from the compressor discharge temperature sensor and runs a High Compressor Discharge Temperature subroutine, pursuant to steps 306–311. The master controller acquires the compressor discharge temperature and determines whether the compressor discharge temperature is above a first limit (e.g., 225° F.), pursuant to steps 307 and 308. If the compressor discharge temperature is above the first limit, the master controller computes the amount by which the compressor discharge temperature exceeds the first limit ($\Delta$ Above First Limit) and stores this computation as the superheat error, pursuant to step 309, thereby at least temporarily overriding the actual superheat error. The corresponding expansion valve is then moved to a more open position using the last step size determined according to the Control Expansion Valve routine, pursuant to steps 310 and 311. The master controller will continue to sample the compressor discharge temperature periodically (e.g., every 2 minutes) and will incrementally move the expansion valve to a more open position until the compressor discharge temperature fails below the first limit. In the event of a high compressor discharge temperature condition, the step size by which the expansion valve is adjusted is limited to "1" or larger (i.e., fractional step sizes are not used). Upon completion of the High Compressor Discharge Temperature subroutine, the master controller returns to the main Control Expansion Valve routine at step 305. If the superheat error, as determined pursuant to step 312, is outside of an acceptable limit (e.g., plus or minus 1° F.) and it is determined, pursuant to step 313, that the error sign (i.e., plus or minus) has changed since the last measurement of superheat error, the next smaller step size is used to adjust the expansion valve, pursuant to step 314 and the expansion valve is adjusted accordingly, pursuant to step 315.

If the superheat error sign has not changed since the last measurement of superheat error, the controller determines whether the actual superheat is less than a lower limit (eg., 2° F.), pursuant to step 316. If the actual superheat is less than the lower limit and at least the last measurement of the actual superheat indicated a negative superheat error (i.e., actual superheat less than target superheat), pursuant to step 317, then the next larger step size is used to adjust the expansion valve, pursuant to step 318, cycling of the outdoor fan (e.g., fan 27 in FIG. 1) is disabled, pursuant to step 319, and the expansion valve is adjusted accordingly, pursuant to step 315.

If the superheat error sign has remained the same for three successive measurements, as determined according to step 320, then the next larger step size is selected, pursuant to step 321 to adjust the position of the expansion valve, pursuant to step 315. If the superheat error sign has not remained the same for three successive measurements, the step size remains unchanged, pursuant to step 322. Upon completion of the Control Expansion Valve routine, the master controller performs the Control Outdoor Fan routine, pursuant to step 104 of FIG. 5. The Control Outdoor Fan routine is described in greater detail in FIG. 8.

Figure 8:
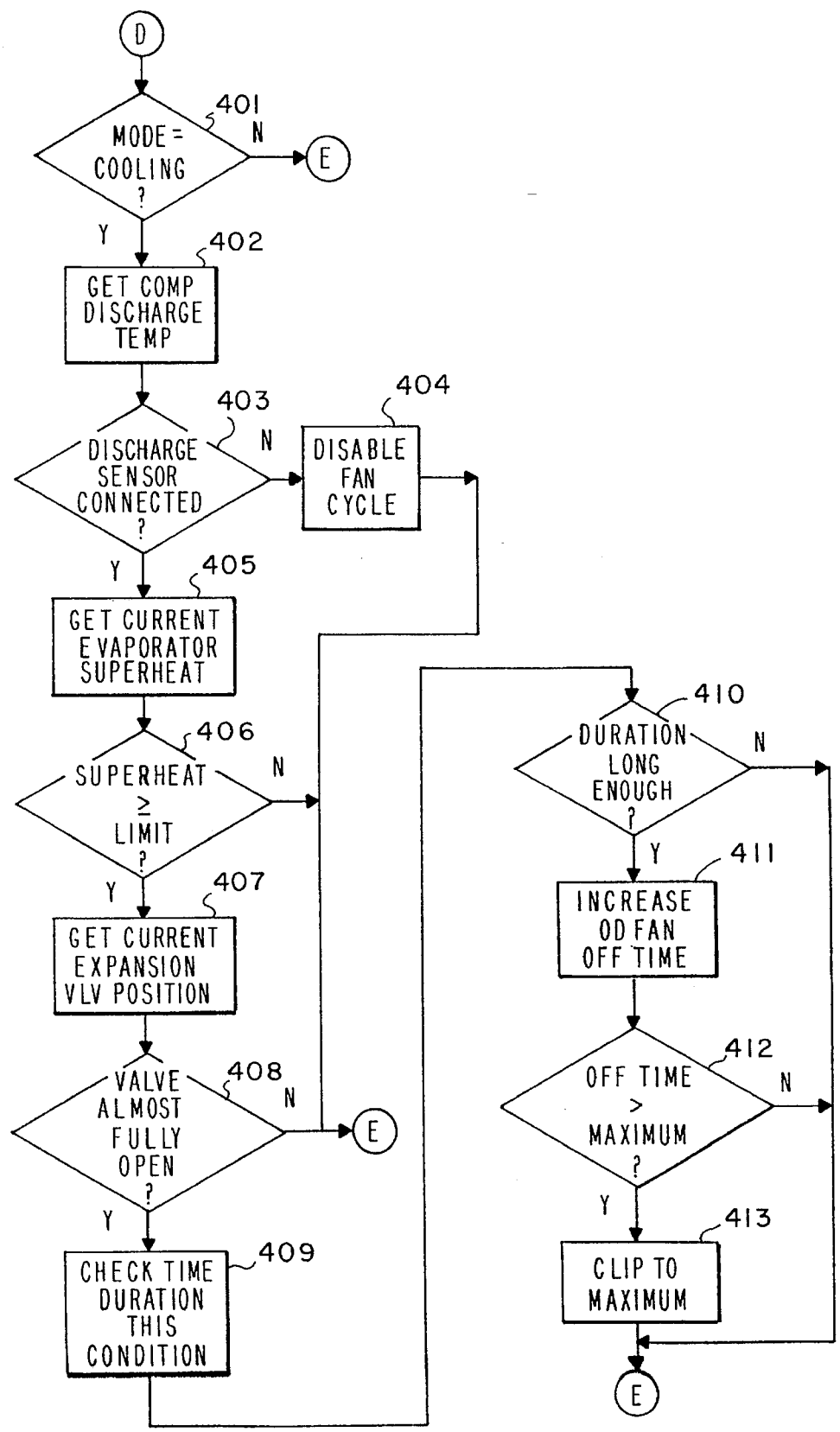

Referring to FIG. 8, the master controller first determines if the system is in the Cooling mode, pursuant to step 401. If not, the master controller exits the Control Outdoor Fan routine. If the system is in the Cooling mode, the master controller acquires the compressor discharge temperature (e.g., from sensor 30 in FIG. 1), pursuant to step 402. If the Compressor discharge temperature sensor is not connected, as determined according to step 403, the cycling of the outdoor fan (e.g., fan 27 in FIG. 1) is disabled, pursuant to step 404, so that the outdoor fan runs continuously during the Cooling mode. The master controller then exits the Control Outdoor Fan routine.

If the compressor discharge temperature sensor is connected, the master controller acquires the current level of superheat across the corresponding evaporator, pursuant to step 405. If it is determined, according to step 406, that the superheat error is greater than or equal to a predetermined limit (e.g., 8° F.), the controller acquires the current position of the corresponding expansion valve, pursuant to step 407. If the expansion valve is already in a fully open or substantially fully open position, as determined according to step 408, and these conditions (i.e., superheat error greater than or equal to the predetermined limit and the expansion valve fully open or substantially fully open) for more than a predetermined time (e.g., 2 minutes), as determined according to steps 409 and 410, a low pressure condition in the condenser (e.g., condenser 22 in FIG. 1) is indicated. This condition may occur at relatively low outdoor ambient temperatures and may result in insufficient pressure to maintain adequate refrigerant flow through the expansion valve. This condition is indicated by abnormally high superheat even with the expansion valve in a fully open or near fully open position.

When this low condenser pressure condition is indicated, the flow rate of the cooling medium across the condenser is reduced to raise condenser pressure. This is preferably accomplished by duty-cycling the outdoor fan on and off. The fan duty cycle typically ranges from ⅛ on to full on (8/8), varying by ⅛ steps (i.e., ⅛, ⅖, ⅜, ⅘, ⅝, ⅚, ⅞ and 8/8). When the outdoor fan is duty-cycled on and off, it is disabled for a selected amount of time during each fan cycle (e.g., 8 seconds). Upon initiation of outdoor fan cycling, the outdoor fan is on ⅞ths of the time (e.g., 7 seconds) and off ⅛th of the time (e.g., 1 second). If the low condenser pressure condition persists during the next measurement cycle (e.g., 2 minutes later), the outdoor fan off time is increased by one step (i.e., on ⅝ and off ⅖), pursuant to step 411. The off time of the outdoor fan during each fan cycle continues to increase until either the low condenser pressure condition is corrected, as evidenced by the superheat error being less than the predetermined limit, or until the maximum outdoor fan off time is reached (i.e., on ⅛ and off ⅞). If the outdoor fan off time reaches the maximum, the outdoor fan soft time will remain at the maximum, pursuant to steps 412 and 413, until the low condenser pressure condition is eliminated. Cycling of the outdoor fan continues until disabled, pursuant to steps 238–245 of FIG. 6C, which are described hereinabove. Upon completion of the Control Outdoor Fan routine, the master controller controls the slave controllers, pursuant to the Control Multi-Unit Operation routine (step 105 in FIG. 5). Referring also to FIG. 4, the Control Multi-Unit Operation routine is depicted in the following Tables III and IV.

TABLE III

| MASTER CONTROLLER | |
| --- | --- |
| Internal Mode | Multi-Unit Output |
| Cooling | Cooling On (Constant True Signal) |
| Off | Cooling Off (Constant False Signal) |
| Defrost | Defrost On (1 Hz Pulse) |
| Defrost | Defrost Off (Constant False Signal) |
| Draining (Compressor Off) | Off (Constant False) |
| Draining/Refreezing (Compressor On) | Cooling (Constant True) |
| Off With Error | Error (2 Hz Pulse) |

TABLE IV

| SLAVE CONTROLLER | | |
| --- | --- | --- |
| Internal Mode | Multi-Unit Input | Multi-Unit Output |
| Cooling | Cooling | Cooling |
| Off Without Error | Off | Off |
| Defrost 1 | Defrost | Defrost |
| Defrost 2 | Off | Defrost |
| Defrost 3 | Cooling | Cooling |
| Draining 1 | Defrost | Defrost |
| Draining 2 | Off | Off |
| Draining 3 | Cooling | Cooling |
| Off With Error | Off | Error |

As previously mentioned, only the master controller (e.g., controller 25b in FIG. 4) can initiate and terminate the Cooling mode. Each slave controller, upon receipt of a Cooling or/and Off signal on its multi-unit input passes the corresponding signal downstream. Similiarly, only the master controller can initiate and terminate the Defrost mode. However, each slave controller controls the defrost operation for its own evaporator. For example, upon initiation of the Defrost mode (identified as Defrost 1 in Table IV), each slave controller passes on the Defrost signal received on its multi-unit input to the next controller in series. However, when the master controller finishes its own defrost cycle, it outputs an Off signal. If a slave controller has not completed its defrost cycle (identified as Defrost 2 in Table IV), that particular slave controller outputs a Defrost signal even if it receives an Off signal on its multi-unit input. However, if the defrost duration programmed for the master controller has been exceeded, the master controller truncates the defrost operation of the slave controllers (identified as Defrost 3 in Table IV) by transmitting a Cooling signal. Upon receipt of a Cooling signal on its multi-unit input, a slave controller truncates its defrost operation (if the defrost operation has not been completed) and transmits the Cooling signal to the next controller in series.

If a slave controller's defrost operation has been completed and the slave controller is in the Draining mode, the slave controller will pass on a Defrost signal received on its multi-unit input (see Draining 1 in Table IV). If the slave controller receives an Off signal on its multi-unit input, it will pass on the Off signal (see Draining 2 in Table IV). If the slave controller receives a Cooling signal on its multi-unit input, it will pass on the Cooling signal (see Draining 3 in Table IV).

Any of the controllers is able to transmit an Error signal (2 Hz steady pulse) indicating a failure condition when the system is in the Off mode. The master controller does not pass the Error signal along as do the slave controllers, but may initiate its own Error signal.

Referring again to FIG. 5, upon completion of the Control Multi-Unit Operation routine, each controller has associated therewith an indicator light for indicating certain operating conditions. Each indicator light is controlled to blink in selected patterns and sequences to indicate various conditions, including both operating conditions and error conditions, according to the following Table V.

TABLE V

| | INDICATOR LIGHT | | | |
| --- | --- | --- | --- | --- |
| | Blink Sequence | | | |
| Mode | Off | On | Off | On |
| Cooling | 2 sec. | 2 sec. | 2 sec. | Faster blinks for superheat count then repeat |
| Off | 7 sec. | 1 sec. | 7 sec. | Repeat |
| Defrost | 1 sec. | 1 sec. | 1 sec. | Repeat |
| Error | 2 sec. | 8 fast blinks | 2 sec. | Slower blinks for error code then repeat |

Error Codes:

| | |
| --- | --- |
| One blink - | Superheat sensor short or open |
| Two blinks - | Space temperature sensor short or open (master controller only) |
| Three blinks - | Compressor discharge temperature sensor short |
| Four blinks - | High compressor discharge temperature |

Upon completion of the Control Indicator Light routine (step 106 of FIG. 5), each controller checks for system errors, pursuant to step 107 of FIG. 5. The system error check involves checking the various temperature sensors (e.g., sensors 28, 29, 30, 31 and 33 in FIG. 1) to determine whether any of these sensors is shorted or open. If a shorted or open condition has persisted for a predetermined time (e.g., 2 minutes), an error condition is indicated and an Error signal is generated by the controller detecting the error condition. Since the space temperature sensor (e.g., sensor 31 in FIG. 1) is not connected to the slave controllers, only the master controller checks for an error condition in this temperature sensor.

In addition to checking for shorted or open temperature sensors, an error condition is also indicated if the compressor discharge temperature is above a second temperature limit (e.g., 275° F.), for a predetermined time (e.g., 2 minutes). The second temperature limit is greater than the first temperature limit described above with reference to the High Compressor Discharge Temperature subroutine described hereinabove with reference to FIG. 7. If any of these error conditions has persisted for a predetermined time (e.g., 2 minutes), an Error signal is generated by the controller detecting on Error condition. Each slave controller passes the Error signal to the next controller in sequence. The master controller does not pass the Error signal along, but may generate its own Error signal.

Upon completion of the Check for System Errors routine, each controller checks for system alarms, pursuant to the Check For System Alarms routine (step 108 of FIG. 5). Each controller has visual and/or audio alarm(s) to detect and indicate selected error or failure conditions. Alarms are generated in response to the following conditions:

1. Power failure on or to a controller;
2. Space temperature 8° F. or more above set point for one hour when not in the Defrost mode (master controller only);
3. Space temperature 4° F. or more below set point for one hour (master controller only); or
4. Compressor discharge temperature above 275° F. for two minutes.

One skilled in the art will recognize that in accordance with the present invention, integrated control of a space cooling system, such as a refrigeration system or a comfort air-conditioning system, is accomplished. In accordance with the present invention, various hardware components typically associated with conventional space cooling systems (e.g., compressor discharge head pressure valve, electro-mechanical defrost timer, low pressure compressor cut-off switch and space thermostat) may be eliminated. Further, other components such as a liquid receiver (e.g., receiver 32 in FIG. 1) and a solenoid-operated valve (e.g., valve 35 in FIG. 1) are optional. Only one of the controllers (typically the master controller) receives inputs from a space temperature sensor and from a compressor discharge temperature sensor. Each slave controller controls a corresponding one of the expansion valves using inputs from inlet and outlet temperature sensors (e.g., sensors 28 and 29 in FIG. 1) associated with a corresponding evaporator. The master controller controls operation of the slave controllers using inputs from the space temperature sensor and the compressor discharge temperature sensor.

Various embodiments of the invention have now been described in detail. Since changes in and additions to the embodiments described hereinabove may be made without departing from the nature, spirit and scope of the invention, the invention is not to be limited to said details, but only by the appended claims and their equivalents.

I claim:

1. In a space cooling system having an evaporator in heat exchange relationship with a space to be cooled, a condenser external to the space, a compressor for circulating heat transfer fluid between the evaporator and the condenser, and an expansion valve between an outlet side of the condenser and an inlet side of the evaporator, the expansion valve being positionable in at least a fully open position to allow the heat transfer fluid to enter the evaporator and a fully closed position to substantially inhibit the heat transfer fluid from entering the evaporator, apparatus for controlling operation of the space cooling system, said apparatus comprising:

first temperature sensing means for sensing a difference in temperature between the heat transfer fluid at the inlet to the evaporator and the heat transfer fluid at an outlet from the evaporator and for generating a first electrical signal indicative thereof, said difference in temperature corresponding to a level of superheat across the evaporator;

second temperature sensing means for sensing temperature of the heat transfer fluid on a discharge side of the compressor and for generating a second electrical signal indicative thereof; and control means for controlling operation of the space cooling system, said control means including first means for increasing pressure of the heat transfer fluid in the condenser in response to said level of superheat indicated by said first electrical signal being greater than a predetermined level when the expansion valve is in the fully open position and the compressor is operative, said control means further including second means for disabling said first means when the compressor is operative in response to the temperature of the heat transfer fluid on the discharge side of the compressor indicated by said second electrical signal being greater than a selected temperature when the compressor is not operative.

2. The apparatus of claim 1 wherein the expansion valve is positionable at a plurality of intermediate positions between the fully open position and the fully closed position to regulate said level of superheat, said control means further including third means for periodically sampling said first electrical signal and for iteratively adjusting the position of the expansion valve in selected increments in response to successive samplings of said first electrical signal until said level of superheat indicated by said first electrical signal meets a desired superheat condition.

3. The apparatus of claim 2 wherein said third means is operable to adjust the position of the expansion valve to a more open position in response to the temperature of the heat transfer fluid on the discharge side of the compressor indicated by said second electrical signal being greater than a predetermined limit when the compressor is operative.

4. The apparatus of claim 3 wherein said third means is operable to periodically sample the second electrical signal and to progressively open the expansion valve in selected increments in response to successive samplings of said second electrical signal until the temperature of the heat transfer fluid on the discharge side of the compressor indicated by said second electrical signal is not greater than said predetermined limit when the compressor is operative.

5. The apparatus of claim 1 wherein the space cooling system further includes condenser cooling means for supplying cooling medium to the condenser, said first means being operable to periodically sample said first electrical signal and to interrupt operation of the condenser cooling means in response to said level of superheat indicated by said first electrical signal being greater than said predetermined level, whereby flow rate of the cooling medium supplied to the condenser is reduced and pressure of the heat transfer fluid in the condenser is increased.

6. The apparatus of claim 1 wherein the space cooling system further includes condenser cooling means for supplying cooling medium to the condenser, said first means being operable to periodically interrupt operation of the condenser cooling means for a selected amount of time in response to said level of superheat indicated by said first electrical signal being greater than said predetermined level, whereby flow rate of the cooling medium supplied to the condenser is reduced and pressure of the heat transfer fluid in the condenser is increased.

7. The apparatus of claim 6 wherein said first means is operable to progressively increase said selected amount of time in response to successive samplings of said first electrical signal indicating that said level of superheat is greater than said predetermined level.

8. In a space cooling system having plural evaporators in heat exchange relationship with a space to be cooled, a condenser external to the space, a compressor for circulating heat transfer fluid between the condenser and each of the evaporators, and plural expansion valves, each of which is operatively associated with a corresponding one of the evaporators and is positionable in at least a fully open position to allow the heat transfer fluid to enter the corresponding evaporator and a fully closed position to substantially inhibit the heat transfer fluid from entering the corresponding evaporator, apparatus for controlling operation of the space cooling system, said apparatus comprising:

plural first temperature sensors, each of which is adapted to sense a difference in temperature between the heat transfer fluid at an inlet to the corresponding evaporator and the heat transfer fluid at an outlet from the corresponding evaporator and for generating a corresponding first electrical signal indicative thereof, said difference in temperature corresponding to a level of superheat across the corresponding evaporator;

a second temperature sensor for sensing temperature of the space and for generating a second electrical signal indicative thereof; and control means for controlling operation of the space cooling system, said control means including plural controllers, each of which is operatively associated with a corresponding one of the evaporators and a corresponding one of the expansion valves, said controllers being electrically interconnected, one of said controllers being a master controller and being operable to activate the compressor to initiate a cooling cycle and to transmit a cooling on signal in response to said second electrical signal indicating a first temperature condition in the space, the other one or more of said controllers being slave controllers, each of said controllers being operable to control operation of the corresponding expansion valve in response to the corresponding first electrical signal when said cooling on signal is being transmitted by said master controller, said master controller being adapted to deactivate the compressor to terminate the cooling cycle and to transmit a cooling off signal in response to said second electrical signal indicating a second temperature condition in the space, each of said slave controllers being responsive to said cooling off signal, said controllers being electrically connected in a series loop, each slave controller being adapted to relay a cooling on signal and a cooling off signal received from an adjacent controller upstream to an adjacent controller downstream, whereby a cooling on signal and a cooling off signal are transmitted from said master controller to said slave controllers.

9. The apparatus of claim 8 wherein the space cooling system further includes defrost means operatively associated with each of the evaporators and each of the controllers, said master controller being operable to transmit a defrost on signal to initiate a system defrost cycle in response to a condition indicating a need for system defrost, each of said controllers being operable to activate the corresponding defrost means to initiate a defrost cycle for the corresponding evaporator in response to said defrost on signal, each of said slave controllers being operable to relay the defrost on signal to an adjacent controller downstream in response to either receipt of the defrost on signal from an adjacent controller upstream or a condition indicating that the defrost cycle for the corresponding evaporator has not been completed, said master controller being operable to transmit a defrost off signal in response to completion of the defrost cycle for the evaporator operatively associated with said master controller, each of said slave controllers being operable to relay said defrost off signal to the adjacent controller downstream in response to both the receipt of said defrost off signal from the adjacent controller upstream and completion of the defrost cycle for the corresponding evaporator, said master controller being adapted to terminate the system defrost cycle in response to either the defrost off signal being relayed from the adjacent slave controller upstream or expiration of a predetermined system defrost time.

10. The apparatus of claim 9 further including a plurality of third temperature sensors, each of which is operatively associated with a corresponding one of the evaporators for sensing temperature of the heat transfer fluid in the corresponding evaporator and for generating a third electrical signal indicative thereof, said condition indicating a need for system defrost corresponding to satisfaction of a predetermined time condition, said completion of the defrost cycle for an evaporator being indicated by the corresponding third electrical signal indicating a predetermined temperature condition of the heat transfer fluid in the corresponding evaporator or the duration of the defrost cycle for the corresponding evaporator having exceeded a maximum time limit.

11. Apparatus of claim 8 wherein the space cooling system further includes a third temperature sensor for sensing temperature of the heat transfer fluid on a discharge side of the compressor and for generating a third electrical signal indicative thereof, said control means including first means for increasing pressure of the heat transfer fluid in the condenser in response to the level of superheat across the evaporator operatively associated with said master controller indicated by the corresponding first electrical signal being greater than a predetermined level when the expansion valve operatively associated with the master controller is in the fully open position and the compressor is operative, said control means further including second means for disabling said first means when the compressor is operative in response to the temperature of the heat transfer fluid on the discharge side of the compressor indicated by said third electrical signal being greater than a selected temperature when the compressor is not operative.

12. Apparatus of claim 11 wherein the space cooling system further includes condenser cooling means for supplying cooling medium to the condenser, said first means being operable to periodically sample the corresponding first electrical signal and to interrupt operation of the condenser cooling means in response to said level of superheat indicated by the corresponding first electrical signal being greater than said predetermined level, whereby flow rate of the cooling medium supplied to the condenser is reduced to increase pressure of the heat transfer fluid in the condenser.

13. Apparatus of claim 11 wherein the space cooling system further includes condenser cooling means for supplying cooling medium to the condenser, said first means being operable to periodically interrupt operation of said condenser cooling means for a selected amount of time in response to the level of superheat indicated by the corresponding first electrical signal being greater than said predetermined level, whereby flow rate of the cooling medium supplied to the condenser is reduced to increase pressure of the heat transfer fluid in the condenser.

14. Apparatus of claim 13 wherein said first means is operable to progressively increase said selected amount of time in response to successive samplings of said first electrical signal indicating that the level of superheat across the corresponding evaporator is greater than said predetermined level.

15. Apparatus of claim 8 wherein each expansion valve is positionable at a plurality of intermediate positions between the fully open position and the fully closed position to regulate the level of superheat across the corresponding evaporator, each controller including means for periodically sampling the corresponding first electrical signal and for iteratively adjusting the position of the corresponding expansion valve in selected increments in response to successive samplings of the corresponding first electrical signal until the level of superheat across the corresponding evaporator indicated by the corresponding first electrical signal meets a desired superheat condition.

16. A space cooling system, comprising:

plural evaporators in heat exchange relationship with a space to be cooled;

a condenser external to the space;

a compressor for circulating heat transfer fluid between the condenser and each of the evaporators;

plural expansion valves, each of which is operatively associated with a corresponding one of the evaporators and is positionable in at least a fully open position to allow heat transfer fluid to enter the corresponding evaporator and a fully closed position to substantially inhibit the heat transfer fluid from entering the corresponding evaporator;

control means for controlling operation of the space cooling system, said control means including:

plural first temperature sensors, each of which is adapted to sense a difference in temperature between the heat transfer fluid at an inlet to the corresponding evaporator and the heat transfer fluid at an outlet from the corresponding evaporator and for generating a corresponding first electrical indicative thereof, said difference in temperature corresponding to a level of superheat across the corresponding evaporator;

a second temperature sensor for sensing temperature of the space and for generating a second electrical signal indicative thereof; and a plurality of controllers, each of which is operatively associated with a corresponding one of the evaporators and a corresponding one of the expansion valves, said controllers being electrically interconnected, one of said controllers being a master controller and being operable to activate the compressor to initiate a cooling cycle and to transmit a cooling on signal in response to said second electrical signal indicating a first temperature condition in the space, the other one or more of said controllers being slave controllers, each of said controllers being operable to control operation of the corresponding expansion valve in response to the corresponding first electrical signal when said cooling on signal is being transmitted by said master controller, said master controller being adapted to deactivate the compressor to terminate the cooling cycle and to transmit a cooling off signal in response to said second electrical signal indicating a second temperature condition in the space, each of said slave controllers being responsive to said cooling off signal, said controllers being electrically connected in a series loop, each slave controller being adapted to relay a cooling on signal and a cooling off signal received from an adjacent controller upstream to an adjacent controller downstream, whereby a cooling on signal and a cooling off signal are transmitted from said master controller to said slave controllers.

17. The system of claim 16 further including a third temperature sensor for sensing temperature of the heat transfer fluid on a discharge side of the compressor and for generating a third electrical signal indicative thereof, said control means including first means for increasing pressure of the heat transfer fluid in the condenser in response to the level of superheat indicated by the corresponding first electrical signal being greater than a predetermined level when the corresponding expansion valve is in the fully open position and the compressor is operative, said control means further including second means for disabling said first means when the compressor is operative in response to the temperature of the heat transfer fluid on the discharge side of the compressor indicated by said third electrical signal being greater than a selected temperature when the compressor is not operative.

18. The system of claim 17 further including condenser cooling means for supplying cooling medium to the condenser, said first means being operable to periodically sample said first electrical signal and to interrupt operation of the condenser cooling means in response to said level of superheat indicated by said first electrical signal being greater than said predetermined level, whereby flow rate of the cooling medium supplied to the condenser is reduced and pressure of the heat transfer fluid in the condenser is increased.

19. The system of claim 16 wherein said master controller is further operable to adjust the position of the corresponding expansion valve to a more open position in response to the temperature of the heat transfer fluid on the discharge side of the compressor indicated by said electrical signal being greater than a predetermined limit when the compressor is operative.

20. The system of claim 16 wherein said system further includes defrost means operatively associated with each of the evaporators and each of the controllers, said master controller being operable to transmit a defrost on signal to initiate a system defrost cycle in response to a condition indicating a need for system defrost, each of said controllers being operable to activate the corresponding defrost means to initiate a defrost cycle for the corresponding evaporator in response to said defrost on signal, each of said slave controllers being operable to relay the defrost on signal to an adjacent controller downstream in response to either receipt of the defrost on signal from an adjacent controller upstream or a condition indicating that the defrost cycle for the corresponding evaporator has not been completed, said master controller being operable to transmit a defrost off signal in response to completion of the defrost cycle for the evaporator operatively associated with said master controller, each of said slave controllers being operable to relay said defrost off signal to the adjacent controller downstream in response to both the receipt of said defrost off signal from the adjacent controller upstream and completion of the defrost cycle for the corresponding evaporator, said master controller being adapted to terminate the system defrost cycle in response to either the defrost off signal being relayed from the adjacent slave controller upstream or expiration of a predetermined defrost time.

* * * * *